US 11,815,196 B2

(12) United States Patent
Blecha

(10) Patent No.: US 11,815,196 B2
(45) Date of Patent: Nov. 14, 2023

(54) VACUUM VALVE

(71) Applicant: VAT Holding AG, Haag (CH)

(72) Inventor: Thomas Blecha, Feldkirch (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 17/773,182

(22) PCT Filed: Oct. 14, 2020

(86) PCT No.: PCT/EP2020/078921
§ 371 (c)(1),
(2) Date: Apr. 29, 2022

(87) PCT Pub. No.: WO2021/083669
PCT Pub. Date: May 6, 2021

(65) Prior Publication Data
US 2022/0373101 A1 Nov. 24, 2022

(30) Foreign Application Priority Data

Oct. 30, 2019 (DE) .......................... 102019129344.8

(51) Int. Cl.
*F16K 3/18* (2006.01)
*F16K 51/02* (2006.01)

(52) U.S. Cl.
CPC .............. *F16K 51/02* (2013.01); *F16K 3/188* (2013.01)

(58) Field of Classification Search
CPC . F16K 51/02; F16K 3/188; F16K 3/18; F16K 31/1225

USPC .......................................................... 251/193
See application file for complete search history.

(56) References Cited

U.S. PATENT DOCUMENTS

| 4,052,036 | A | 10/1977 | Schertler |
| 4,470,576 | A | 9/1984 | Schertler |
| 4,560,141 | A | 12/1985 | Bosch |
| 6,056,266 | A | 5/2000 | Blecha |
| 6,237,892 | B1 | 5/2001 | Ito |
| 6,899,316 | B2 | 5/2005 | Duelli |
| 7,066,443 | B2 | 6/2006 | Ishigaki |

(Continued)

FOREIGN PATENT DOCUMENTS

| AT | 511372 | 11/2012 |
| CN | 107763236 | 3/2018 |

(Continued)

*Primary Examiner* — John Bastianelli
(74) *Attorney, Agent, or Firm* — Volpe Koenig

(57) ABSTRACT

A vacuum valve having a valve body, a closure member, a valve rod which supports the closure member, a guide piece by which the valve rod is movably guided parallel to a longitudinal displacement direction, a longitudinal travel drive by which the valve rod is displaceable with respect to the guide piece parallel to the longitudinal displacement direction, a transverse travel drive, and a slide part which is movable by the transverse travel drive, is guided by a primary linear guide to be movable with respect to the valve body, and is guided by a secondary linear guide to be movable with respect to the guide piece. The primary and secondary linear guides each run at an angle of less than 45° with respect to the longitudinal displacement direction, and the primary linear guides form an angle of more than 3° and less than 45° with the secondary linear guides.

15 Claims, 7 Drawing Sheets

(56) References Cited

U.S. PATENT DOCUMENTS

| | | |
|---|---|---|
| 7,611,122 B2 | 11/2009 | Tichy |
| 7,762,527 B2 | 7/2010 | Schoen et al. |
| 8,177,190 B2 | 5/2012 | Maerk |
| 9,664,293 B2 | 5/2017 | Zanetti |
| 9,732,860 B2 | 8/2017 | Blecha et al. |
| 9,957,745 B2 | 5/2018 | Ehrne |
| 9,976,655 B2 * | 5/2018 | Ehrne .................... F16K 3/182 |
| 10,234,059 B2 | 3/2019 | Ehrne et al. |
| 2012/0258242 A1 | 10/2012 | Tsunada et al. |
| 2013/0112906 A1 * | 5/2013 | Ishigaki .................. F16K 3/184 |
| | | 251/328 |
| 2014/0183391 A1 | 7/2014 | Blecha |
| 2015/0308584 A1 | 10/2015 | Ehrne et al. |
| 2016/0003363 A1 | 1/2016 | Blecha et al. |
| 2018/0051825 A1 * | 2/2018 | Ehrne .................... F16K 51/02 |
| 2018/0274695 A1 * | 9/2018 | Ehrne .................... F16K 51/02 |

FOREIGN PATENT DOCUMENTS

| | | |
|---|---|---|
| DE | 102012021354 | 5/2013 |
| DE | 102013006123 | 10/2013 |
| WO | 2011088482 | 7/2011 |
| WO | 2014075757 | 5/2014 |
| WO | 2014174926 | 10/2014 |
| WO | 2015139818 | 9/2015 |
| WO | 2016142150 | 9/2016 |
| WO | 2016155976 | 10/2016 |
| WO | 2017025329 | 2/2017 |
| WO | 2010034046 | 4/2020 |

* cited by examiner

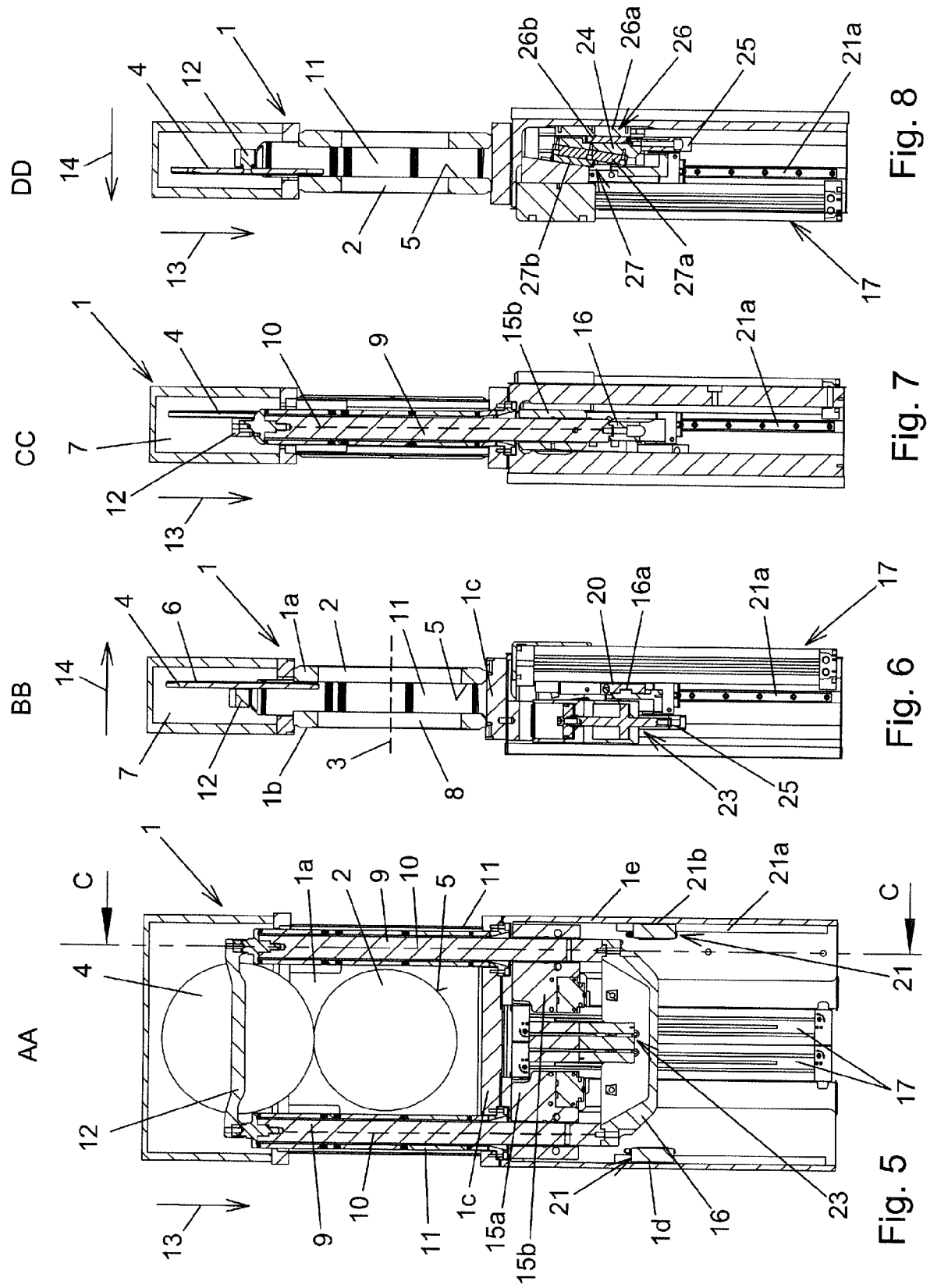

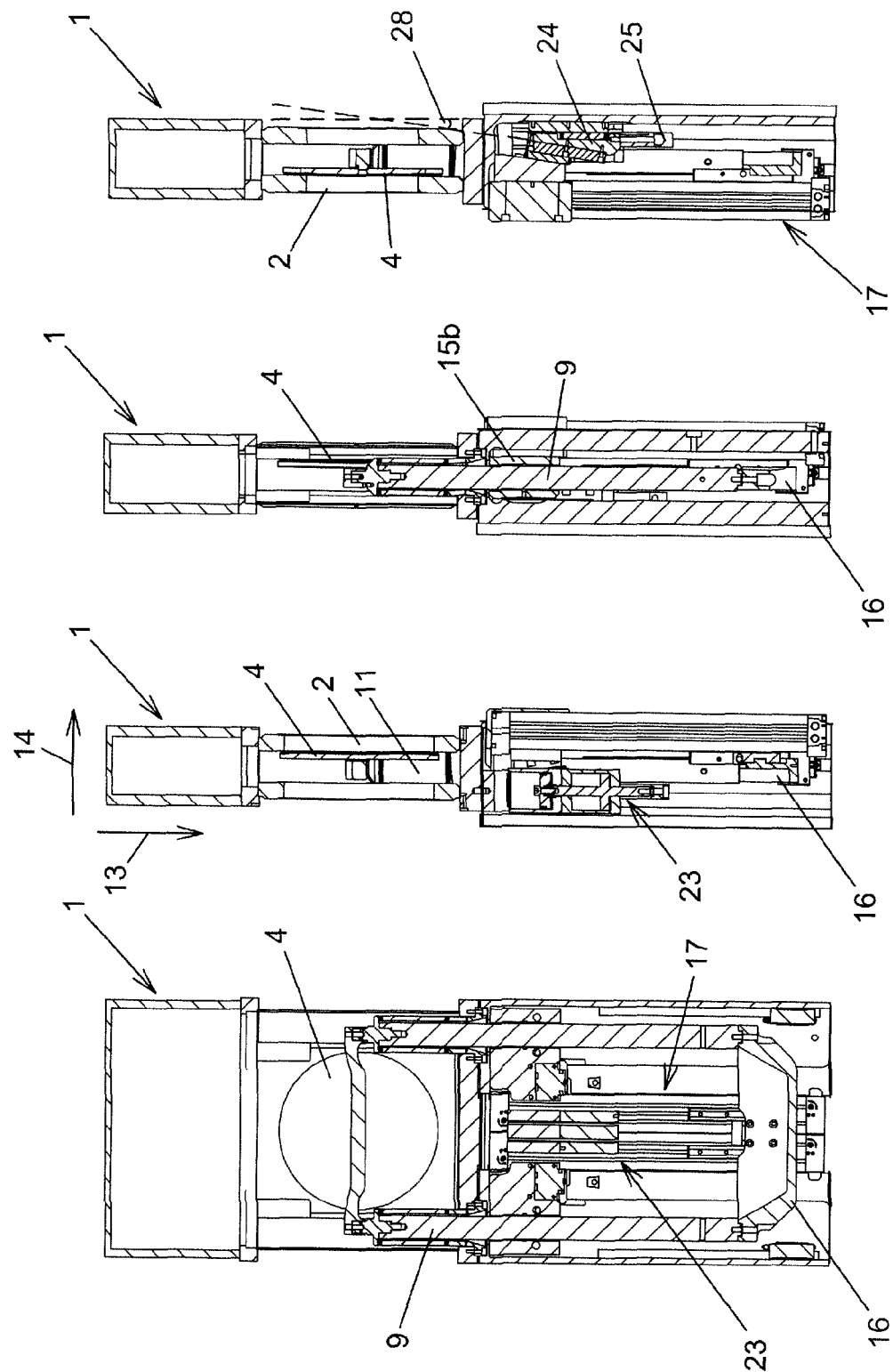

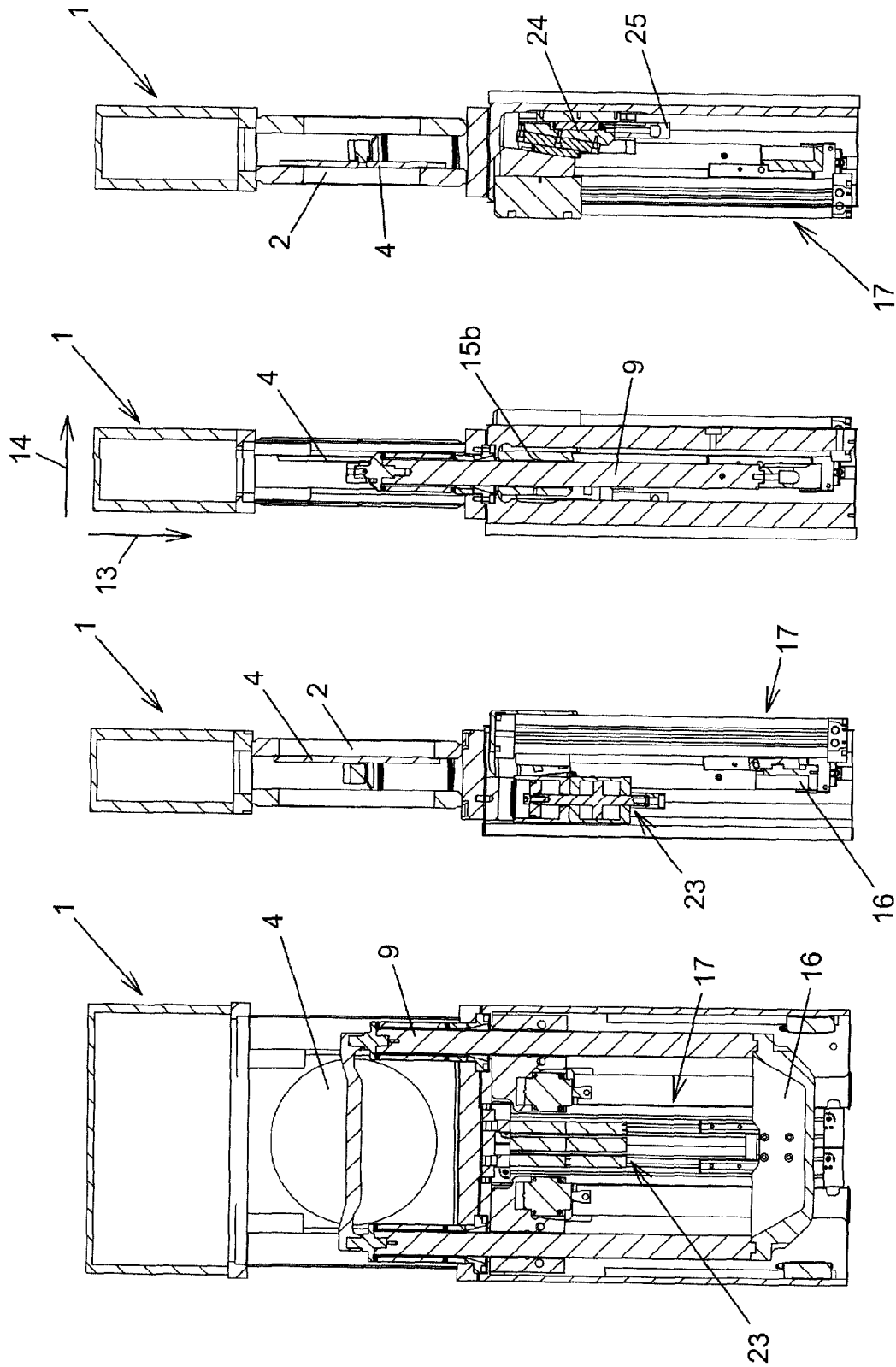

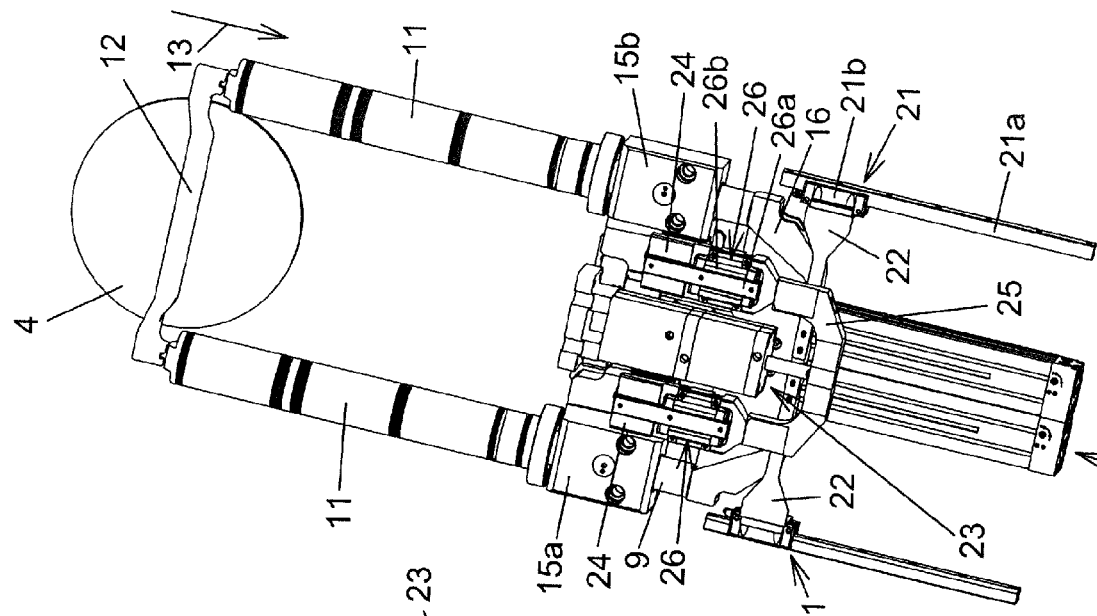
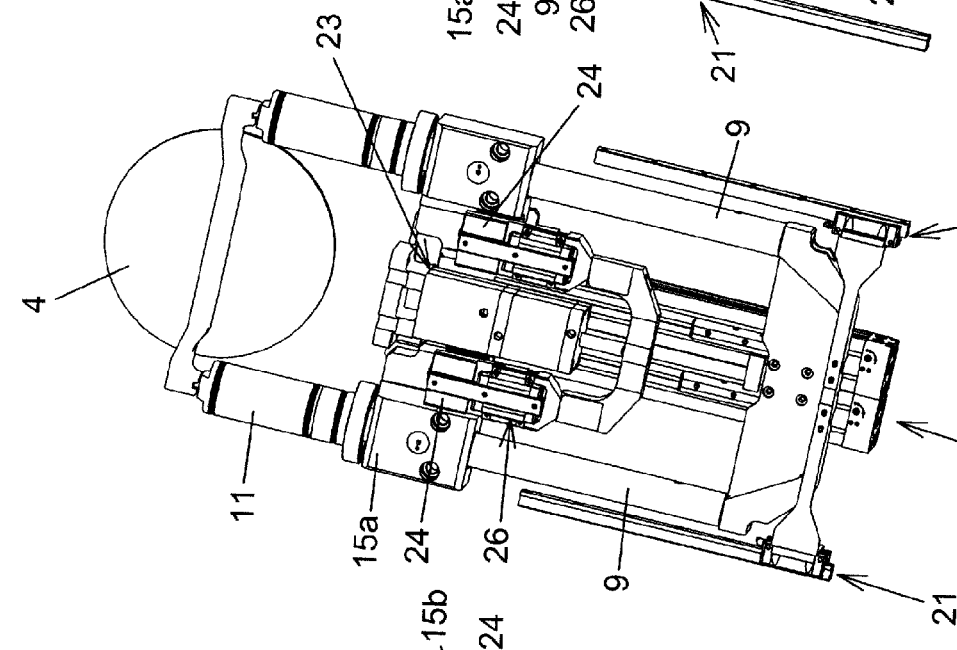
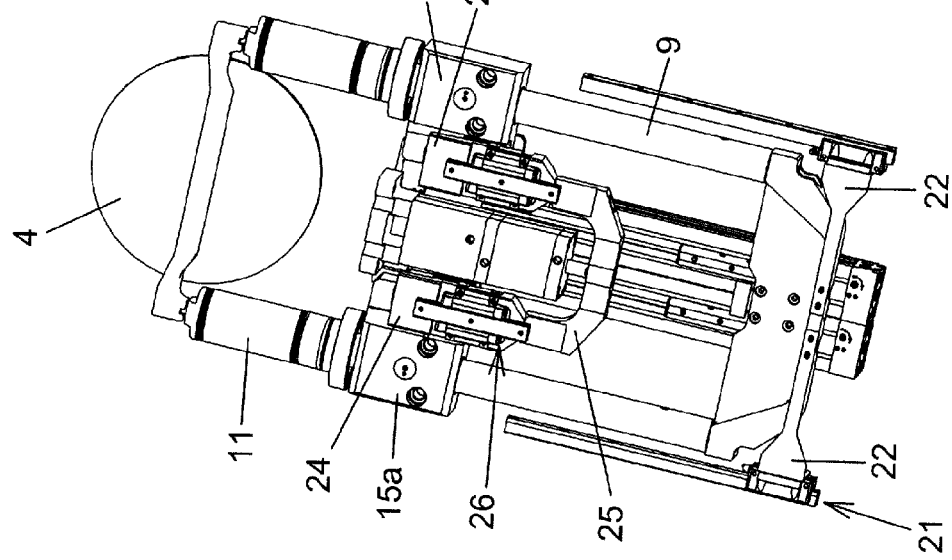

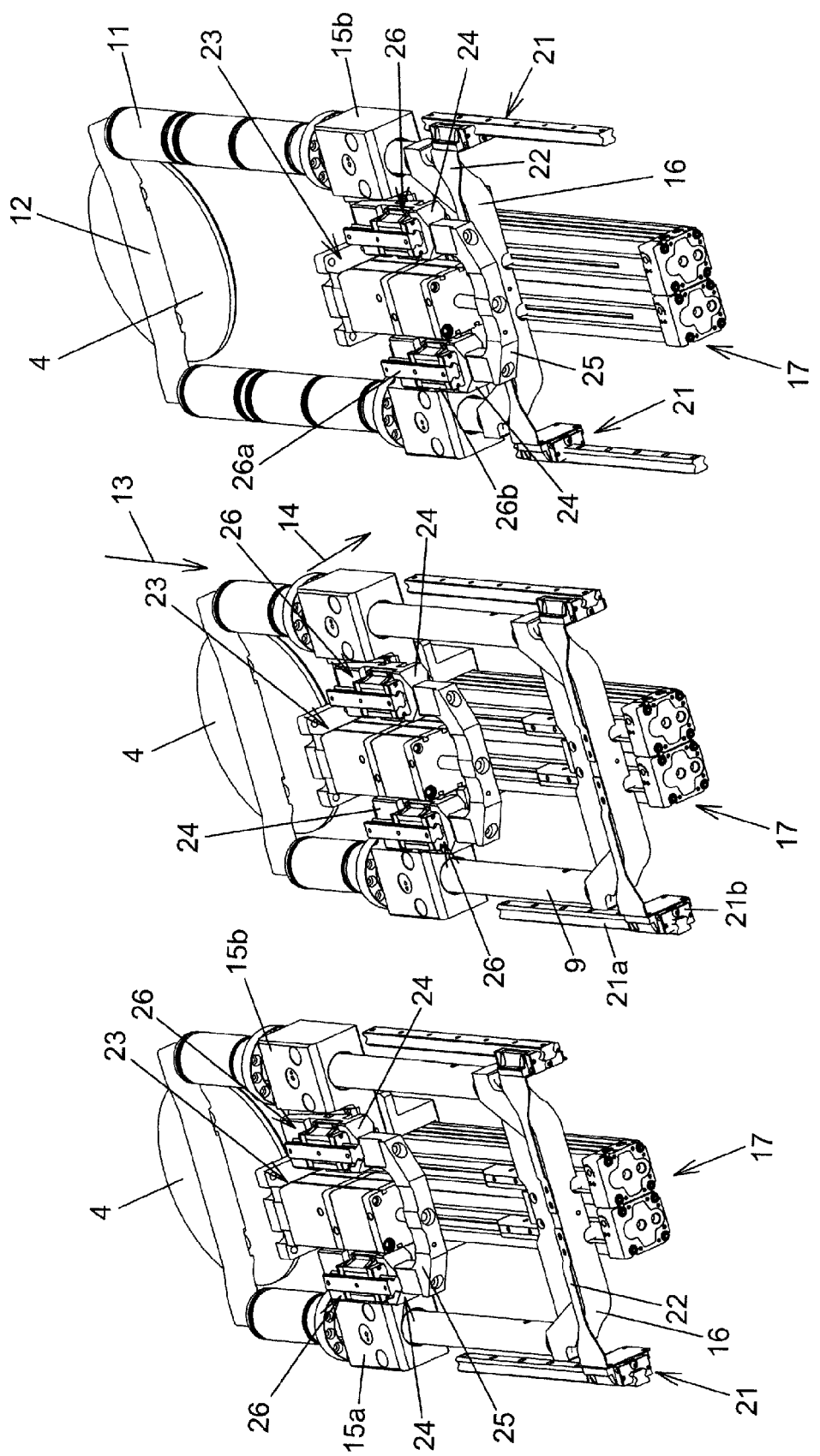

VACUUM VALVE

TECHNICAL FIELD

The invention relates to a vacuum valve comprising a valve body with a valve opening which is surrounded by a valve seat, a closure member which can be adjusted parallel to a longitudinal displacement direction between an open position, in which it opens up the valve opening, and an intermediate position, in which it covers the valve opening but is lifted off from the valve seat, and which can be adjusted parallel to a transverse displacement direction between the intermediate position and the closed position, in which it bears against the valve seat, at least one valve rod which carries the closure member and which is situated parallel to the longitudinal displacement direction, at least one guide piece by which the at least one valve rod is guided so as to be displaceable parallel to the longitudinal displacement direction, a longitudinal travel drive by which, for adjustment of the closure member between the open position and the intermediate position, the at least one valve rod can be displaced with respect to the at least one guide piece parallel to the longitudinal displacement direction, a transverse travel drive by which, for adjustment of the closure member between the intermediate position and the closed position, the at least one guide piece can be displaced parallel to the transverse displacement direction.

BACKGROUND

Vacuum valves in the case of which, for closing the vacuum valve, the closure member is firstly displaced in a longitudinal displacement direction which is parallel to the valve rod from an open position into an intermediate position, in which the closure member covers the valve opening but is still lifted off from the valve seat, and is subsequently placed against the valve seat in a transverse displacement direction, which is at an angle to the longitudinal displacement direction, are also referred to as L-valves.

In a non-generic type of construction of L-valves, the valve rod is mounted so as to pivotable about an axis which is at a right angle to the longitudinal displacement direction, so as to allow the adjustment of the valve plate from its intermediate position into its closed position and back. For the pivoting of the valve rod about the axis, use may be made here of slotted guides, such as is known for example from U.S. Pat. No. 6,237,892 B1, U.S. Pat. No. 7,066,443 B2 or US 2012/0258242 A1.

In the case of L-valves in which, for adjustment of the closure member between the intermediate position and the closed position, a parallel displacement of the closure member in a transverse displacement direction, which is at an angle, in particular at a right angle, to the longitudinal displacement direction, is realized, it is the case according to a conventional embodiment that drive elements for adjustment of the closure member between the intermediate position and the closed position are arranged on a carrier unit which carries the closure member, wherein the carrier unit is situated within the valve housing of the vacuum valve and is attached to a valve rod which is led out of the vacuum region of the vacuum valve. Such embodiments of L-valves emerge for example from U.S. Pat. Nos. 6,056,266 A, 6,899,316 B2, 7,611,122 B2, 6,056,266 A, 7,611,122 B2 and 8,177,190 B2.

Valves of the type mentioned in the introduction emerge from WO 2010/034046 A1, WO 2015/139818 A1, WO 2014/075757 A1 and U.S. Pat. No. 9,732,860 B2. The valves here are L-valves with a linear displacement of the closure member between the intermediate position and the closed position in which both the drive for adjustment of the closure member between the open and intermediate positions and the drive for adjustment of the closure member between the intermediate and closed positions are arranged outside the vacuum region of the vacuum valve.

In the case of the vacuum valve known from WO 2010/034046 A1, provision is made outside the vacuum region of a guide piece which mounts the valve rod such that the latter can be displaced in the longitudinal displacement direction and which also has cylinder chambers for pistons of the longitudinal travel drive and which can be displaced linearly in a transverse displacement direction, which is at a right angle to the longitudinal displacement direction, wherein this linear displacement is realized by means of piston/cylinder units acting in this direction. A similar vacuum valve emerges from WO 2015/139818 A1.

In the case of the vacuum valve known from WO 2014/075757 A1, a block is attached to the valve rod outside the vacuum region and is guided by a guide piece, which has rod-like guide parts, so as to be displaceable in the longitudinal displacement direction. The rod-like guide parts can be displaced in the transverse displacement direction, which is at a right angle to the longitudinal displacement direction, specifically by means of a transverse travel drive which is formed by piston/cylinder units. For displacement of the valve rod in the longitudinal displacement direction, use is made of piston/cylinder units connected to the block.

U.S. Pat. No. 7,762,527 B2 also presents an embodiment of an L-valve, in which the drives for linear adjustment of the closure member in the longitudinal displacement direction and in the transverse displacement direction are arranged outside the vacuum region of the vacuum valve. One possible design provides here that the piston/cylinder unit for adjustment of the closure member in the longitudinal displacement direction with respect to the valve body is mounted by means of a linear guide so as to be displaceable in the transverse displacement direction, which is at a right angle to the longitudinal displacement direction.

WO 2016/142150 A1 discloses a vacuum valve in the case of which a block attached to the valve rod outside the vacuum region can be displaced parallel to the longitudinal displacement direction by means of linear guides which are attached on either side of said block, specifically by means of a piston/cylinder unit acting on the block. For their part, said linear guides are guided displaceably by further linear guides, which are attached on either side thereof and are situated obliquely with respect to the longitudinal and transverse displacement directions, wherein a displacement of said further linear guides is realized by means of further piston/cylinder units. Similar vacuum valves having such linear guides situated obliquely with respect to one another also emerge from U.S. Pat. No. 10,234,059 B2 and U.S. Pat. No. 9,957,745 B2, wherein, in the first-mentioned document, two valve plates can be placed alternately against oppositely situated valve seats so as to close off oppositely situated valve openings, and, in the second-mentioned document, only one drive is provided and coupling of the movements of the linear guides is realized via coupling springs, which are compressed after a block attached to the valve rod comes into abutment with a stop.

Other types of vacuum valves, which have wedge-shaped closure members which are pressed into wedge-shaped surfaces of valve seats during closure of the vacuum valve (cf. for example WO 2011/088482 A1, DE 10 2013 006 123 A1, U.S. Pat. No. 9,664,293 B2 and WO 2017/025329 A1), or which have closure members with two plates having oblique surfaces that can be spread apart by means of elements interacting therewith (cf. for example U.S. Pat. Nos. 4,560,141 A, 4,052,036 A and 4,470,576 A), are known.

AT 511 372 A1 discloses a vacuum valve in the case of which the closure member can be adjusted rectilinearly in a closing direction from an open position into a closed position. In this case, the valves rods, which are attached on either side of the closure member, extend from the closure member in the closing direction, that is to say, in the open position, the closure member is situated on that side of the valve opening which is remote from the drive.

SUMMARY

It is an object of the invention to provide a vacuum valve of the type mentioned in the introduction in the case of which a relatively large closing force can advantageously be applied.

According to the invention, this is achieved by a vacuum valve having one or more of the features disclosed herein.

In the case of the vacuum valve according to the invention, the at least one valve rod is guided by at least one guide piece so as to be linearly displaceable parallel to the longitudinal displacement direction. A longitudinal travel drive serves for displacement of the at least one valve rod with respect to the at least one guide piece parallel to the longitudinal displacement direction. A transverse travel drive serves for linear displacement of the at least one guide piece parallel to the transverse displacement direction, which is at an angle, preferably at a right angle, to the longitudinal displacement direction. For this purpose, provision is made of at least one slide part which is guided by a primary linear guide so as to be linearly displaceable with respect to the valve body and which is guided by a secondary linear guide so as to be linearly displaceable with respect to the at least one guide piece. The primary and secondary linear guides each have an angle of less than 45°, preferably less than 25°, to the longitudinal displacement direction and include an angle of greater than 3°, preferably greater than 4°, and less than 45°, preferably less than 25°, with one another. For displacement of the closure member between the intermediate position and the closed position, the at least one slide part is displaced by the transverse travel drive. In this way, the at least one guide piece, and thus the at least one valve rod, is displaced linearly parallel to the transverse displacement direction, whereby the closure member is pressed against the valve seat.

Due to the large closing force that is able to be applied in the case of the vacuum valve of the invention, the vacuum valve may advantageously have a relatively large valve opening.

In an advantageous embodiment of the invention, in the open position, the closure member is situated on that side of the valve opening which is remote from the longitudinal travel and transverse travel drives. Consequently, in the intermediate and closed positions, the closure member may be situated relatively close to the at least one guide piece, whereby advantageous lever ratios can be achieved during the pressing of the closure member against the valve seat by way of the transverse displacement of the at least one guide piece.

Expediently, for displaceable guidance of the at least one valve rod by the at least one guide piece, it is provided that a respective valve rod passes through an opening in the respective guide piece. In an advantageous embodiment, provision is made of two valve rods which, at one of their ends, are connected to the closure member, preferably via a carrier bracket connecting the valve rods, and, at their other ends, are connected by a yoke. The longitudinal travel drive expediently acts on said yoke, wherein at least one drive part of the longitudinal travel drive, which at least one drive part can be moved in the longitudinal displacement direction, is preferably connected to the yoke in such a way that it can be moved with respect to the yoke in the transverse displacement direction. The longitudinal travel drive, that is to say at least one housing part of the longitudinal travel drive, may then be connected rigidly to the valve body.

The primary linear drives are expediently situated parallel to the longitudinal displacement direction. The transverse travel drive, that is to say at least one housing part of the transverse travel drive, may then be connected rigidly to the valve body.

In a preferred embodiment of the invention, provision is made of two slide parts which are each guided by a primary linear guide so as to be displaceable with respect to the valve body and are each guided by a secondary linear guide so as to be displaceable with respect to the guide piece or a respective guide piece and which are connected by a yoke, on which yoke the transverse travel drive acts.

For guidance of the at least one valve rod in an end region situated opposite the closure member, provision is expediently made of at least one longitudinal linear guide which is fastened to the valve body and which is situated parallel to the longitudinal displacement direction. In this case, provision is made of at least connecting element, which allows mobility of the at least one valve rod parallel to the transverse displacement direction. For example, said connecting element may be a leaf spring. A surface normal to said leaf spring is in this case at a right angle to the longitudinal displacement direction.

Where, in the present document, reference is made to the situation of a linear guide or to an angle at which the linear guide is situated, then this relates to the direction parallel to which a slide of the linear guide is displaceable in a guide part of the linear guide.

As linear guides for the primary and/or secondary linear guides and/or longitudinal linear guides, use may advantageously be made of rail guides, that is to say the guide part, along which the slide can be displaced, is formed by a guide rail. In particular, the slide of the linear guide may be mounted with respect to the guide rail by way of rolling bodies, for example by means of encircling rolling-body guides or by means of rolling bodies mounted in raceway cages. Sliding guidance of the slide with respect to the guide rail is in principle also possible. Preferably, use may be made of conventional linear guides, such as are used in large numbers as standard components in mechanical engineering. Such linear guides are inexpensive, exhibit smooth movement and have little play or no play (due to being preloaded).

The use of linear guides of some other design, for example in the form of shaft guides in which the guide parts are formed by bars which, in cross section, are in particular round, would also be conceivable and possible. A design using at least one guideway into which at least one guide extension (pin or roller) engages, that is to say a design in the manner of a slotted guide, is also possible and conceivable. The guideway may be formed for example by a slot, a groove or a bead.

BRIEF DESCRIPTION OF THE DRAWINGS

Further advantages and details of the invention will be discussed below on the basis of the appended drawing, in which:

FIG. 5 shows a section along the line A-A in FIG. 4;

FIG. 6 shows a section along the line B-B in FIG. 3;

FIG. 7 shows a section along the line C-C in FIG. 5;

FIG. 8 shows a section along the line D-D in FIG. 3;

FIGS. 9 to 12 show sections corresponding to the sections in FIGS. 5 to 8, but in the intermediate position of the closure member;

FIGS. 13 to 16 show sections corresponding to the sections in FIG. 5 to FIG. 8, but in the closed position of the closure member;

FIGS. 18, 19 and 20 show oblique views in the open position, intermediate position and closed position of the closure member with the valve housing removed; and FIGS. 21, 22 and 23 show oblique views analogous to FIGS. 18, 19 and 20 from another viewing direction.

DETAILED DESCRIPTION

Figure 4:
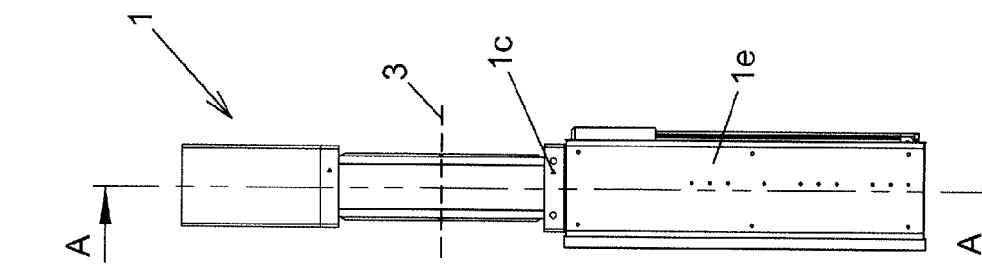
FIGS. 3 and 4 shows a front view and a side view in the open position of the closure member.
Figure 3:
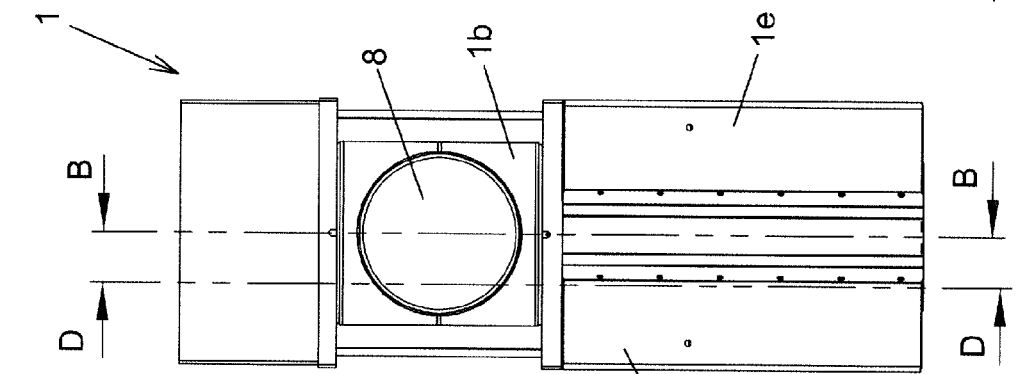
Figure 2:
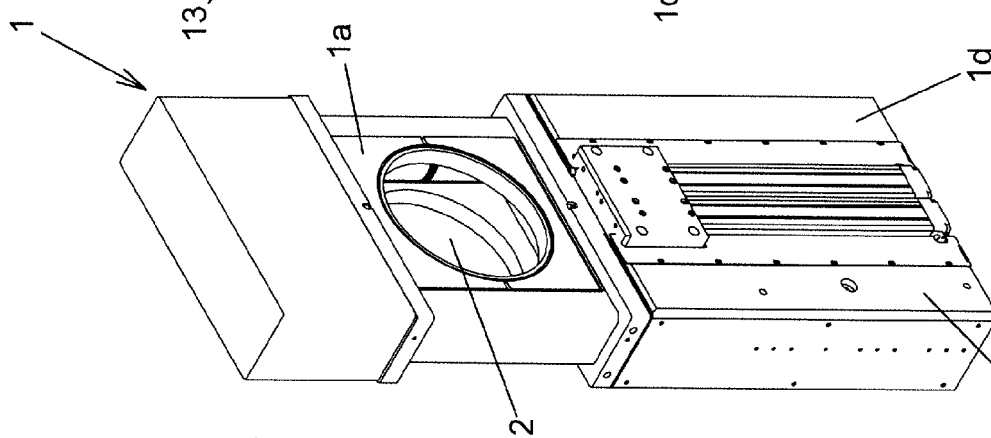
FIGS. 1 and 2 show oblique views of a vacuum valve according to one exemplary embodiment of the invention from different viewing directions in the open position of the closure member.
Figure 1:
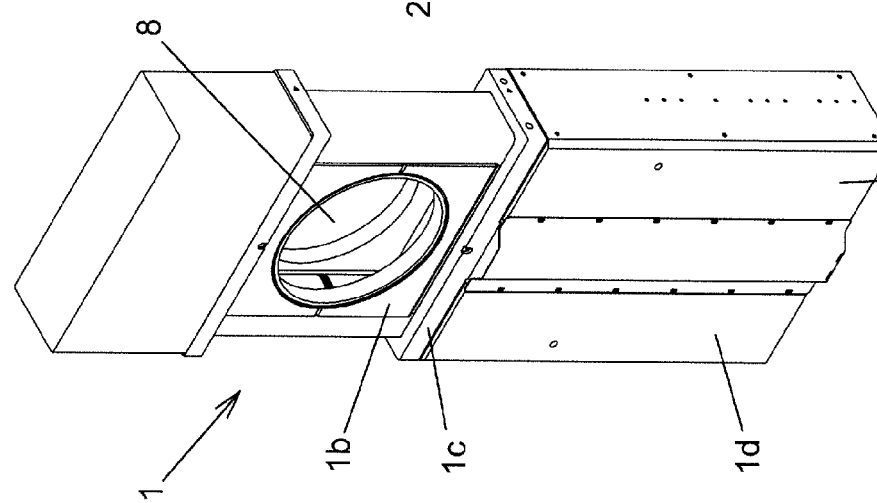

One exemplary embodiment of a vacuum valve according to the invention is illustrated in the figures.

The vacuum valve has a valve body 1, said valve body having a wall 1a which has a valve opening 2 with an axis 3. In the closed state of the vacuum valve, the valve opening 2 is closed off by an in particular plate-shaped closure member 4, which then assumes its closed position. In the closed position of the closure member 4, the latter is pressed against a valve seat 5, which surrounds the valve opening 2 on the side facing toward the closure member 4. In the open state of the vacuum valve, the closure member 4 opens up the valve opening 2 and the closure member 4 then assumes its open position. The adjustment of the closure member 4 between the closed position and the open position is realized via an intermediate position, in which the closure member, as seen in the direction of the axis 3 of the valve opening 2, covers the valve opening 2 but is lifted off from (at a distance from) the valve seat 5.

For sealing between the closure member 4 and the wall of the valve body 1 that has the valve opening 2 in the closed position of the closure member 4, use is made of an elastic sealing ring 6 (for example composed of FKM or FFKM) that is arranged on the closure member 4 and the valve seat 5 has a sealing surface against which the sealing ring 6 is pressed.

In principle, it would also be possible for the sealing ring 6 to be arranged on the sealing seat and to be pressed against a sealing surface of the closure member 4.

The valve body 1 has an interior space 7 in which the closure member 4 is arranged. Said interior space 7 of the valve body 1 forms a vacuum region of the vacuum valve (=a region in which a vacuum may be present). The valve body 1 has a further opening 8 in a further wall 1b, so that a passage channel extending through the interior space 7 is formed by the valve body 1. In the exemplary embodiment, said passage channel extends rectilinearly in the direction of the axis 3.

Thus, in the exemplary embodiment, the walls 1a, 1b and the further parts surrounding the interior space 7, comprising inter alia the base 1c, together form a valve housing of the valve body 1, which valve housing has the interior space 7. Said valve housing is connected rigidly to a drive housing of the valve body 1, said drive housing accommodating elements (described further below) of the valve drive. The drive housing has inter alia side pieces 1d, 1e.

The valve body 1 may be connected to other parts of a vacuum installation, for example vacuum chambers and/or pipelines. Then, in the open position of the closure member 4, the interior space 7 of the valve body 1 is connected to the interior space of a first part of the vacuum installation via the opening 2, and the interior space 7 is connected to the interior space of a further part of the vacuum installation via the opening 8.

The vacuum valve could in principle also be in the form of a so-called insert, wherein, in the operating state of the vacuum valve, the valve body 1 could be arranged in the interior space of a vacuum chamber on a wall of the vacuum chamber and so as to be sealed off with respect thereto, such that the valve opening 2 is aligned with an opening in the wall of the vacuum chamber. The opposite wall of the vacuum valve, with the opening 8, could then be dispensed with. Then, too, the closure member 4 is arranged in a vacuum region of the vacuum valve.

The closure member 4 is carried by two valve rods 9, in the exemplary embodiment via a bracket 12 connecting the valve rods, to which bracket the closure member 4 is fastened. The valve rods 9 are led out of the vacuum region of the vacuum valve through openings in the base 1c of the valve body 1, wherein said valve rods can be moved in the direction of their mutually parallel longitudinal axes 10 (which are parallel to the longitudinal displacement direction 13) and also in a transverse displacement direction 14, which is at an angle, in particular at a right angle, thereto. A corrugated bellows 11 is used for this purpose in the exemplary embodiment. In principle, provision may for this purpose also be made of another type of vacuum leadthrough, for example another type of bellows or a linear leadthrough, which is itself mounted so as to be displaceable in the transverse displacement direction 14 in a sealed-off manner with respect to the base 1c.

The valve rods 9 are mounted by at least one guide piece 15a, 15b which is situated outside the vacuum region of the vacuum valve, in the exemplary embodiment therefore outside the valve housing, so as to be displaceable in the direction of their longitudinal axes 10, that is to say parallel to the longitudinal displacement direction 13. The at least one guide piece 15a, 15b can itself be adjusted in the transverse displacement direction 14, as will be discussed in more detail further below.

In the exemplary embodiment, for the two valve rods 7, a separate guide piece 15a, 15b is provided in each case. Each of the guide pieces 15a, 15b has, for longitudinal guidance of the respective valve rod 9, an opening through which the respective valve rod 9 extends. The guide pieces 15a, 15b could also, for example, be formed integrally with one another or be connected to one another by a connecting part.

For adjustment of the valve rod 9 in and counter to the longitudinal displacement direction 13, use is made of a longitudinal travel drive 17. In the exemplary embodiment, this is formed by two piston/cylinder units, whose housings are connected rigidly to the valve body 1. For example, it would also be possible for the longitudinal travel drive to have only a single piston/cylinder unit or to be formed by an actuator which is designed in a different way.

Figure 17:
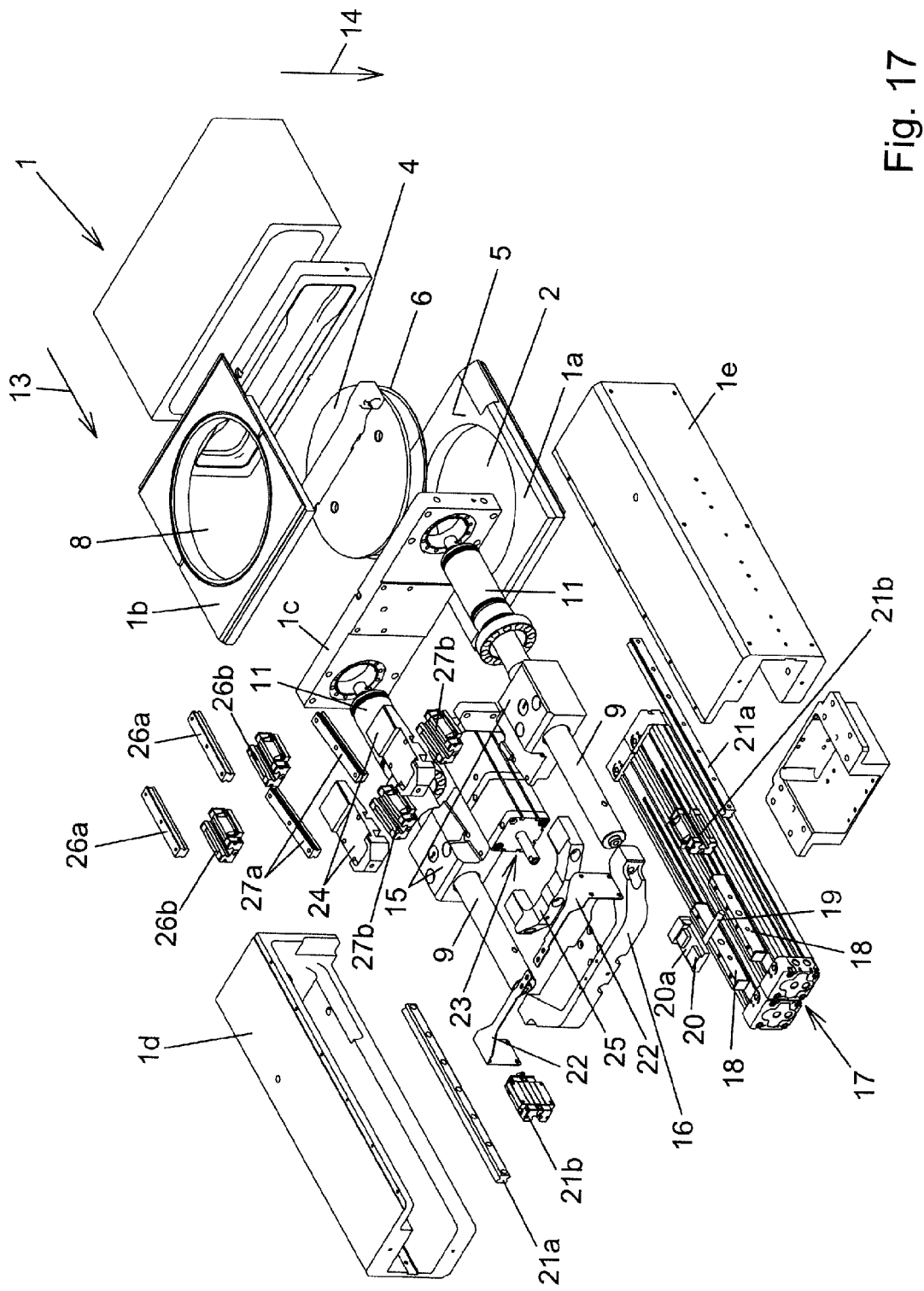
FIG. 17 shows an exploded illustration (parts of the valve housing and of the drive housing having been omitted for the sake of clarity)

At their ends remote from the closure member 4, the valve rods 9, in the exemplary embodiment, are connected to one another by a yoke 16. In the exemplary embodiment, the longitudinal travel drive 17 acts on the yoke 16. The piston/cylinder units may for example, as conventionally known, be equipped with rodless pistons, wherein the movement of the pistons is transmitted to driven drive parts 18 which are situated on the outer side of the cylinder housings. A connecting part 20 is connected to said drive parts via a pin 19. The connecting part 20 has a depression 20*a* (cf. for example FIG. 17) in which a projection 16*a* (cf. for example FIG. 6) on the bottom side of the yoke 16 engages. In this way, a displacement of the yoke 16, and thus of the valve rod 9, with respect to the respective drive part 18 of the longitudinal travel drive 17 parallel to the transverse displacement direction 14 is made possible when the closure member 4, as described in more detail further below, is adjusted from the intermediate position into the closed position and vice versa.

For assisting the displaceable guidance of the valve rods 9 in the longitudinal displacement direction 13, use is made in the exemplary embodiment of longitudinal linear guides 21. These are connected by way of their fixed part, in the exemplary embodiment the rail-like guide part 21*a*, rigidly to the valve body 1, and by way of their movable part, in the exemplary embodiment the slide 21*b*, in each case via a connecting element 22, to the valve rods 9, specifically in the exemplary embodiment to the yoke 16. In the exemplary embodiment, the connecting elements 22 are leaf springs. Consequently, movement of the valve rod 9 parallel to the transverse displacement direction 14 is made possible.

For adjusting the guide pieces 15*a*, 15*b*, and thus also the valve rods 9 and the closure member 4 carried thereby, in and counter to the transverse displacement direction, which, in the exemplary embodiment, is parallel to the axis 3 of the valve opening 2, as is preferable, use is made of a transverse travel drive 23 which interacts with two slide parts 24. The two slide parts 25 are situated on either side of the transverse travel drive 23 and are connected to one another by a yoke 25. In the exemplary embodiment, the transverse travel drive 23 is formed by a piston/cylinder unit, wherein the cylinder housing is connected rigidly to the valve body 1. The piston rod of said piston/cylinder unit is connected to the yoke 25. For the transverse travel drive 23, it would also be possible for provision to be made for example of two piston/cylinder units or at least one actuator which is designed in a different way.

Preferably, the transverse travel drive 23 acts parallel to the longitudinal displacement direction 13, as illustrated in the figures. In the case of the design as a piston/cylinder unit, it is thus the case that the at least one piston (two pistons being provided in the exemplary embodiment) can be moved parallel to the longitudinal displacement direction 13.

A respective slide part 24 is guided by a respective primary linear guide 26 so as to be linearly displaceable with respect to the valve body 1. The slide (=guide carriage) 26*b* of the primary linear guide is in this case connected rigidly to the slide part 24, and the rectilinearly extending guide part 26*a* of the primary linear guide is connected rigidly to the valve body 1. In the exemplary embodiment, the guide part 26*a* is, for this purpose, fastened to a respective one of the side pieces 1*d*, 1*e*. A reversed design, in which the guide part 26*a* is connected rigidly to the slide part 24 and the slide 24*b* is connected rigidly to the valve body is also conceivable and possible.

A respective slide part 24 is furthermore guided by a respective secondary linear guide 27 so as to be linearly displaceable with respect to the respective guide piece 15*a*, 15*b*. In the exemplary embodiment, for this purpose, the rectilinearly extending guide part 27 of the secondary linear guide is connected rigidly to the slide part 24 and the slide (=guide carriage) 27*b* of the secondary linear guide is connected rigidly to the respective guide piece 15*a*, 15*b*. A reversed design, that is to say a rigid connection of the slide 27*b* to the slide part 24 and a rigid connection of the guide part 27*a* to the respective guide piece 15*a*, 15*b* is also conceivable and possible.

The primary linear guides 26, which are situated parallel to one another, include with the secondary linear guides 27, which are situated parallel to one another, an angle 28 (indicated in FIG. 12) of more than 3° and less than 45°. Preferably, the angle 28 lies in the range of 5° to 20°.

Here, the primary linear guides 26 and the secondary linear guides 27 lie in a plane spanned by the longitudinal displacement direction 13 and the transverse displacement direction 14.

The guidance directions of the primary and secondary linear guides 26, 27 are thus oriented in the manner of a wedge with respect to one another, wherein the tip of said wedge is preferably situated on that side of the linear guides 26, 27 which faces toward the closure member 4.

In the exemplary embodiment, the primary linear guides 26 are situated parallel to the longitudinal displacement direction 13.

In a modified embodiment, an angled orientation of the primary linear guide 26 with respect to the longitudinal displacement direction 13 would also be conceivable and possible. The secondary linear guides 27 could then be arranged parallel to the longitudinal displacement direction 13 or likewise at an angle to the longitudinal displacement direction 13 (but at any rate in a wedge-shaped manner with respect to the primary linear guides 26). However, the angles at which the primary and secondary linear guides 26, 27 are arranged with respect to the longitudinal displacement direction 13 are at any rate less than 45°, preferably less than 25°.

In the exemplary embodiment, the two slide parts 24 are situated between the two valve rods 9.

For closing the vacuum valve proceeding from the open position illustrated in FIGS. 1 to 8, in which the closure member 4 is in the open position, the closure member 4 is firstly, by means of the longitudinal travel drive 17, displaced in the longitudinal displacement direction 13 until it has passed into its intermediate position, which is illustrated in FIGS. 9 to 12.

In the open position, the closure member 4 is, in the exemplary embodiment, situated on that side of the valve opening 2 which is remote from the drive, that is to say the valve rods 9 project from the closure member 4 in the longitudinal displacement direction, in which the adjustment of the closure member from the open position into the intermediate position is realized. In other words, the closure member 4 is adjusted from the open position into the intermediate position by a pulling force acting on the valve rods 9, and from the intermediate position into the open position by a pushing force acting on the valve rods 9.

For adjustment of the closure member from the intermediate position into the closed position, in which the vacuum valve is closed and which is illustrated in FIGS. 13 to 16, the slide parts 24 are displaced linearly from a start position into an end position by the transverse travel drive 23. Due to the displacement of the slide parts 24 and the wedge-shaped positioning of the primary and secondary linear guides 26, 27 with respect to one another, a linear displacement of the guide pieces 15*a*, 15*b* in the transverse displacement direction 14 is realized here. In the exemplary embodiment, the slide parts 24, as already mentioned, are displaced with respect to the valve body 1 in the longitudinal displacement direction 13. In the case of an oblique position of the primary linear guides 26 with respect to the valve body 1, a displacement of the slide parts 24 with respect to the valve body 1 would be realized in an oblique displacement direction, which is at an angle to the longitudinal displacement direction.

The opening of the vacuum valve is realized in reverse order. Firstly, the slide parts 24 are displaced by the transverse travel drive 23 from the end positions into the start positions, wherein a linear adjustment of the guide pieces 15a, 15b counter to the transverse displacement direction 14, and consequently an adjustment of the closure member 4 counter to the transverse displacement direction 14 from the closed position into the intermediate position, is realized. Subsequently, the valve rods 9 and thus the closure member 4 are displaced by the longitudinal travel drive 17 counter to the longitudinal displacement direction 13, whereby the closure member 4 is adjusted from the intermediate position into the open position.

Different further modifications of the exemplary embodiment shown are conceivable and possible without departing from the scope of the invention. In this regard, it would be possible for example for the closure member 4 to be situated, in the open position, on that side of the valve opening 2 which faces toward the drive (so that the closure member is thus pushed during the adjustment from the open position into the intermediate position and pulled during the adjustment from the intermediate position into the open position).

For adjustment of the guide parts 15a, 15b in the transverse displacement direction 14, it would be possible for only one slide part 24 acted on by the transverse travel drive 23 to be provided, wherein the guide pieces 15a, 15b could be connected rigidly to one another. It would then be possible for only a single primary linear guide 26 and/or single secondary linear guide 27 for displaceable guidance of the slide part 26 to be provided.

It would be possible for provision to be made of only one valve rod for holding the closure member 4, which valve rod is mounted by a guide piece so as to be displaceable parallel to the longitudinal displacement direction, wherein it would be possible for only one slide part 24 interacting with the guide piece to be provided.

In the exemplary embodiment, the linear guides 21, 26, 27 are, as mentioned, in the form of rail guides, as is preferable. In this case, the slides have a channel which is open at both ends and toward a longitudinal side and which engages around a widened head region of the guide rail. In particular, in relation to a cross section at a right angle to the longitudinal extent of the guide rail, the channel has a region with a relatively large diameter, in which the head region of the guide rail is situated, and a region with a relatively small diameter, through which a relatively narrow neck region of the guide rail extends. The slide is thus secured in a form-fitting manner against being pulled off from the guide rail in all directions at a right angle to the longitudinal extent of the guide rail.

In the exemplary embodiment, in the case of the primary and secondary linear guides 26, 27, that side of the channel of the slide which is open in relation to a cross section at a right angle to the longitudinal extent of the guide rail has in each case a direction which lies in the plane spanned by the longitudinal and transverse displacement directions 13, 14. It would instead be possible for this direction to also be at an angle, in particular at a right angle, to said plane.

It would also be conceivable and possible for individual or all of these linear guides 21, 26, 27 to be formed in another way, for example to be in the form of shaft guides (in the case of which bars, in particular with a round cross section, are provided instead of rails) or slotted guides.

The longitudinal linear guides 21 could in principle also be dispensed with.

| Legend for the Reference Signs | |
|---|---|
| 1 | Valve body |
| 1a | Wall |
| 1b | Wall |
| 1c | Base |
| 1d | Side piece |
| 1e | Side piece |
| 2 | Valve opening |
| 3 | Axis |
| 4 | Closure member |
| 5 | Valve seat |
| 6 | Sealing ring |
| 7 | Interior space |
| 8 | Opening |
| 9 | Valve rod |
| 10 | Longitudinal axis |
| 11 | Corrugated bellows |
| 12 | Bracket |
| 13 | Longitudinal displacement direction |
| 14 | Transverse displacement direction |
| 15a | Guide piece |
| 15b | Guide piece |
| 16 | Yoke |
| 16a | Projection |
| 17 | Longitudinal travel drive |
| 18 | Drive part |
| 19 | Pin |
| 20 | Connecting part |
| 20a | Depression |
| 21 | Longitudinal linear guide |
| 21a | Guide part |
| 21b | Slide |
| 22 | Connecting element |
| 23 | Transverse travel drive |
| 24 | Slide part |
| 25 | Yoke |
| 26 | Primary linear guide |
| 26a | Guide part |
| 26b | Slide |
| 27 | Secondary linear guide |
| 27a | Guide part |
| 27b | Slide |
| 28 | Angle |

The invention claimed is:

1. A vacuum valve, comprising:
a valve body with a valve opening which is surrounded by a valve seat,
a closure member which is adjustable parallel to a longitudinal displacement direction between an open position, in which the closure member opens up the valve opening, and an intermediate position, in which the closure member covers the valve opening but is lifted off from the valve seat and which is adjustable parallel to a transverse displacement direction between the intermediate position and a closed position, in which the closure member bears against the valve seat,
at least one valve rod which carries the closure member and which is situated parallel to the longitudinal displacement direction,
at least one guide piece by which the at least one valve rod is guided so as to be displaceable parallel to the longitudinal displacement direction with respect to the at least one guide piece,
a longitudinal travel drive by which, for adjustment of the closure member between the open position and the intermediate position, the at least one valve rod is displaceable with respect to the at least one guide piece parallel to the longitudinal displacement direction, a transverse travel drive by which, for adjustment of the closure member between the intermediate position and the closed position, the at least one guide piece is adjustable parallel to the transverse displacement direction, at least one slide part which is guided by a primary linear guide so as to be displaceable with respect to the valve body and which is guided by a secondary linear guide so as to be displaceable with respect to the at least one guide piece, the primary and secondary linear guides each have an angle of less than 45° to the longitudinal displacement direction and the primary linear guide includes an angle of greater than 3° and less than 45° with the secondary linear guide, and for displacement of the at least one guide piece parallel to the transverse displacement direction, the at least one slide part is displaceable by the transverse travel drive.

2. The vacuum valve as claimed in claim 1, wherein the at least one primary linear guide is situated parallel to the longitudinal displacement direction, and displacement of the at least one slide part is carried out by the transverse travel drive parallel to the longitudinal displacement direction.

3. The vacuum valve as claimed in claim 1, wherein the longitudinal travel drive is connected rigidly to the valve body, and at least one movable drive part of the longitudinal travel drive is connected to the at least one valve rod such that the at least one valve rod is movable in the transverse displacement direction.

4. The vacuum valve as claimed in claim 1, wherein the at least one valve rod comprises two of the valve rods which carry the closure member and which, at an end remote from the closure member, are connected to one another by a yoke, and the longitudinal travel drive acts on the yoke.

5. The vacuum valve as claimed in claim 1, wherein the at least one guide piece configured for displaceable guidance of a respective valve rod has in each case an opening through which the valve rod extends.

6. The vacuum valve as claimed in claim 1, wherein the at least one slide part comprises a first and a second slide part which are each guided by the at least one primary linear guide so as to be displaceable with respect to the valve body and which are each guided by the at least one secondary linear guide so as to be displaceable with respect to the at least one guide piece and which are connected to one another by a yoke, and the transverse travel drive acts on the yoke.

7. The vacuum valve as claimed in claim 1, wherein the transverse travel drive is connected rigidly to the valve body.

8. The vacuum valve as claimed in claim 1, wherein the longitudinal travel drive has at least one piston/cylinder unit, and the transverse travel drive has at least one transverse drive piston/cylinder unit, and the at least one piston/cylinder unit of the longitudinal travel drive and the at least one transverse drive piston/cylinder unit of the transverse travel drive are situated parallel to one another.

9. The vacuum valve as claimed in claim 1, wherein a guidance direction predefined by the at least one secondary linear guide is oriented with respect to a guidance direction predefined by the at least one primary linear guide to form a wedge shape, and a tip of the wedge shape is situated on that side of the primary and secondary linear guides which faces toward the closure member.

10. The vacuum valve as claimed in claim 1, wherein the at least one valve rod is mounted displaceably outside a vacuum region of the vacuum valve by the at least one guide piece.

11. The vacuum valve as claimed in claim 1, wherein in the open position, the closure member is situated on that side of the valve opening which is remote from the longitudinal travel and the transverse travel drives.

12. The vacuum valve as claimed in claim 1, wherein, for guidance of the at least one valve rod in an end region which is remote from the closure member, the vacuum valve further comprises at least one longitudinal linear guide having a guide part or a slide connected rigidly to the valve body and an other of the guide part or the slide connected to the at least one valve rod, and at least one connecting element which allows mobility of the at least one valve rod parallel to the transverse displacement direction.

13. The vacuum valve as claimed in claim 12, wherein the at least one connecting element which allows mobility of the at least one valve rod parallel to the transverse displacement direction comprises a leaf spring which has a surface normal at a right angle to the longitudinal displacement direction.

14. The vacuum valve as claimed in claim 1, wherein the at least one primary linear guide and the at least one secondary linear guide include an angle of less than 25° with the longitudinal displacement direction.

15. The vacuum valve as claimed in claim 14, wherein at least one primary linear guide includes an angle of greater than 4° and less than 25° with the at least one secondary linear guide.

* * * * *